(12) United States Patent
Lagowski et al.

(10) Patent No.: US 11,520,208 B2
(45) Date of Patent: Dec. 6, 2022

(54) SYSTEM AND METHOD FOR MULTI-ZONE DIMMING WINDOW SYSTEM

(71) Applicant: Gentex Corporation, Zeeland, MI (US)

(72) Inventors: Autumn N. Lagowski, Holland, MI (US); George A. Neuman, Holland, MI (US); Michael T. Stephenson, Holland, MI (US); Luke A. Bomers, Grandville, MI (US); Barry K. Nelson, Howard City, MI (US); Henry A. Luten, Holland, MI (US); Dennis D. Festerling, Jr., Allegan, MI (US); David J. Cammenga, Zeeland, MI (US); John S. Anderson, Holland, MI (US); Michael J. VanAst, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 747 days.

(21) Appl. No.: 16/506,029

(22) Filed: Jul. 9, 2019

(65) Prior Publication Data
US 2020/0019034 A1 Jan. 16, 2020

Related U.S. Application Data

(60) Provisional application No. 62/696,097, filed on Jul. 10, 2018, provisional application No. 62/827,731, filed on Apr. 1, 2019.

(51) Int. Cl.
*G02F 1/163* (2006.01)
*B60J 3/04* (2006.01)
(Continued)

(52) U.S. Cl.
CPC .............. *G02F 1/163* (2013.01); *B60J 3/04* (2013.01); *B60J 1/02* (2013.01); *B60J 1/08* (2013.01); *B60J 1/18* (2013.01); *B60J 7/043* (2013.01)

(58) Field of Classification Search
CPC ... B60J 3/04; B60J 7/043; B60J 7/0435; B60J 7/022; G02F 1/163
(Continued)

(56) References Cited

U.S. PATENT DOCUMENTS 5,805,330 A 9/1998 Byker et al.
5,940,201 A 8/1999 Ash et al.
(Continued)

FOREIGN PATENT DOCUMENTS

CN 108146201 A * 6/2018 ............ B60J 3/04
EP 2985183 A2 2/2016
(Continued)

*Primary Examiner* — Dennis H Redder
(74) *Attorney, Agent, or Firm* — Price Heneveld LLP; Brian James Brewer

(57) ABSTRACT

A window control system includes a plurality of electro-optic devices configured to control a transmittance of light through each of the plurality of zones, and at least one sensor configured to identify an intensity of light transmitted through the at least one window. A controller k in communication with the electro-optic devices and the at least one sensor. The controller is configured to independently control the transmittance of the light through each of the zones based on at least one of a direction of the light and an intensity of the light detected in a passenger compartment of a vehicle.

19 Claims, 7 Drawing Sheets

(51) Int. Cl.
*B60J 1/18* (2006.01)
*B60J 1/02* (2006.01)
*B60J 7/043* (2006.01)
*B60J 1/08* (2006.01)

(58) Field of Classification Search
USPC ..................................................... 296/96.19
See application file for complete search history.

(56) References Cited

U.S. PATENT DOCUMENTS

| | | | |
|---|---|---|---|
| 6,137,620 A | 10/2000 | Guarr et al. | |
| 6,239,898 B1 | 5/2001 | Byker et al. | |
| 6,407,847 B1 | 6/2002 | Poll et al. | |
| 6,433,914 B1 | 8/2002 | Lomprey et al. | |
| 6,567,708 B1 | 5/2003 | Bechtel et al. | |
| 6,597,489 B1 | 7/2003 | Guarr et al. | |
| 7,085,609 B2 | 8/2006 | Bechtel et al. | |
| 7,372,611 B2 | 5/2008 | Fonar et al. | |
| 8,102,586 B2 * | 1/2012 | Albahri | B32B 17/10513 359/265 |
| 8,547,624 B2 | 10/2013 | Ash et al. | |
| 9,964,828 B2 | 5/2018 | Theiste et al. | |
| 9,994,091 B2 * | 6/2018 | Kaphengst | G02F 1/163 |
| 2014/0320946 A1 * | 10/2014 | Tomkins | B60J 3/04 359/275 |
| 2015/0298607 A1 | 10/2015 | Salter et al. | |
| 2017/0100991 A1 | 4/2017 | Cammenga et al. | |
| 2018/0046058 A1 * | 2/2018 | Kaphengst | G02F 1/293 |
| 2018/0128044 A1 * | 5/2018 | Ochiai | E06B 9/24 |
| 2018/0129172 A1 | 5/2018 | Shrivastava et al. | |

FOREIGN PATENT DOCUMENTS

| | | |
|---|---|---|
| RU | 126290 U1 | 3/2013 |
| RU | 2015113773 A | 11/2016 |

* cited by examiner

SYSTEM AND METHOD FOR MULTI-ZONE DIMMING WINDOW SYSTEM

CROSS REFERENCE TO RELATED APPLICATIONS

This application claims priority under 35 U.S.C. § 119(e) and the benefit of U.S. Provisional Application Nos. 62/696,097 entitled SYSTEM AND METHOD FOR MULTI-ZONE DIMMING WINDOW SYSTEM, filed on Jul. 10, 2018, by Luke A. Bomers, et al. and 62/827,731 entitled SYSTEM AND METHOD FOR MULTI-ZONE DIMMING WINDOW SYSTEM, filed on Apr. 1, 2019, by Autumn N. Lagowski, et al., the entire disclosure of which is incorporated herein by reference.

FIELD OF THE DISCLOSURE

The present disclosure relates generally to a control system for an electro-optic device and, more particularly, relates to a multi-zone control system for a plurality of electro-optic devices.

SUMMARY

In an aspect, a window control system is disclosed. The system may be configured to control a transmittance through a plurality of zones of at least one window. The window control system configured to selectively adjust light transmittance through at least one dimming zone of at least one window may comprise: at least one electro-optic device, each of the at least one electro-optic devices configured to control the transmittance of light through one of the at least one dimming zones of the at least one window; at least one sensor configured to identify an intensity of light transmitted through the at least one dimming zone of the at least one window; a controller in communication with the at least one electro-optic device and the at least one sensor, wherein the controller may be configured to control the transmittance of the light through at least one of the at least one dimming zones based on at least one of a direction of the light detected by the sensor and an intensity of the light detected by the sensor.

The at least one window may be in a vehicle; and the at least one window may be one of a side window, a windshield, a rear window, a vent window, and a sunroof. The at least one sensor may comprise an exterior or external light sensor configured to identify a direction of light impinging on the vehicle. The at least one sensor may comprise an interior light sensor configured to identify a light intensity within a passenger compartment of the vehicle. The at least one sensor may comprise an outward facing sensor configured to identify a light intensity passing through a windshield to a passenger compartment of the vehicle. The at least one sensor may comprise an occupancy sensor configured to identify a location of at least one occupant in a passenger compartment of the vehicle.

The controller may comprise a processor; the processor may be configured to generate a light intensity map based on inputs received from the at least one sensor. The controller may control the transmittance of light based on the light intensity map. The window control system further may comprise at least a second dimming zone within the window; the control of the transmittance of light through the second dimming zones may be independent of the control of the transmittance of light through the at least one dimming zone. The window control system further may comprise at least a second window; the control of the light transmittance through the second window may be independent of the control of the transmittance of light through the at least one window.

The controller may be further configured to: identify a path of the light entering through the at least one window based on the direction of the light, and control a first transmittance of the light through a first dimming zone and a second transmittance of light through a second dimming zone, wherein the second transmittance is greater than the first transmittance. The controller may be further configured to: control a first transmittance of the light through a first dimming zone and a second transmittance of light through a second zone based on the location of an occupant and the direction of the light. The at least one dimming zone may comprise an entire window.

In an aspect, a method of control light transmission through at least a portion of a window, comprises the steps of: initializing a window control routine for controlling light transmission through at least a portion of the window; receiving, by a controller, inputs from at least one of an interior sensor, an exterior sensor, an outward facing sensor, and an occupancy sensor; and controlling at least one dimming zone of a vehicle window based on received inputs. The method may further comprise updating the system operation in response to changes in the received inputs. The method may also comprise manually adjusting, by a user through a user interface, at least one dimming zone. The method may further comprise detecting a direction in which the vehicle is heading. Further, the method may comprise detecting the direction of sunlight hitting vehicle based on a vehicle operating direction. Additionally, the method may comprise comparing a vehicle operating direction to information on a time of day and geographic region to determine the direction from which sunlight is striking the vehicle.

In another aspect, a window control system for a vehicle may comprise a first outward facing sensor disposed within a passenger compartment of the vehicle and configured to sense an intensity of light that enters the vehicle through a windshield of the vehicle from the exterior of the vehicle; a second sensor configured to sense glare entering the interior of the vehicle through a window other than the windshield of the vehicle; at least one electro-optic device, each electro-optic device being configured to selectively adjust light transmission through at least one dimming zone of the window other than the windshield of the vehicle; and a controller in communication with the outward facing sensor, the second sensor, and at least one of the electro-optic devices, and configured to selectively control the light transmission through the at least one electro-optic device based on inputs received from the first outward facing sensor and the second sensor.

In yet another aspect, a window control system for a vehicle comprises: at least one outward facing sensor disposed within a passenger compartment of the vehicle and configured to sense an intensity of light that enters the vehicle from the exterior of the vehicle; at least one electro-optic device, each electro-optic device being configured to selectively adjust light transmission through at least one dimming zone of a window of the vehicle; and a controller in communication with the at least one outward facing sensor and each of the at least one electro-optic devices. The at least one outward facing light sensor may be configured to sense light entering the vehicle through a windshield of the vehicle. The window control system may further comprise at least one light sensor comprising at least one of an exterior sensor disposed on an exterior of the vehicle and at least one of an interior sensor disposed within a passenger compartment of the vehicle; the at least one light sensor may be in communication with the controller. The controller may be configured to generate a light intensity map of the interior of the passenger compartment of the vehicle based on inputs received by the controller from at least one of the at least one light sensor and the at least one outward facing sensor. The controller may be capable of causing each of the electro-optic devices to selectively darken or clear based on inputs received from at least one of the at least one sensor and the at least one outward facing light sensor. The at least one interior sensor may be disposed inside a passenger compartment of the vehicle; and the at least one interior sensor may be configured to sense light in at least a portion of a passenger compartment of the vehicle.

The at least one interior light sensor may be one of an ambient light sensor and a directional light sensor. The at least one exterior sensor may be disposed on an exterior surface of the vehicle; and the at least one exterior sensor may be configured to sense light impinging on at least a portion of the exterior surface of the vehicle. The at least one exterior sensor may be one of an ambient light sensor and a directional light sensor.

These and other features, advantages, and objects of the present device will be further understood and appreciated by those skilled in the art upon studying the following specification, claims, and appended drawings.

DETAILED DESCRIPTION

Figure 1:
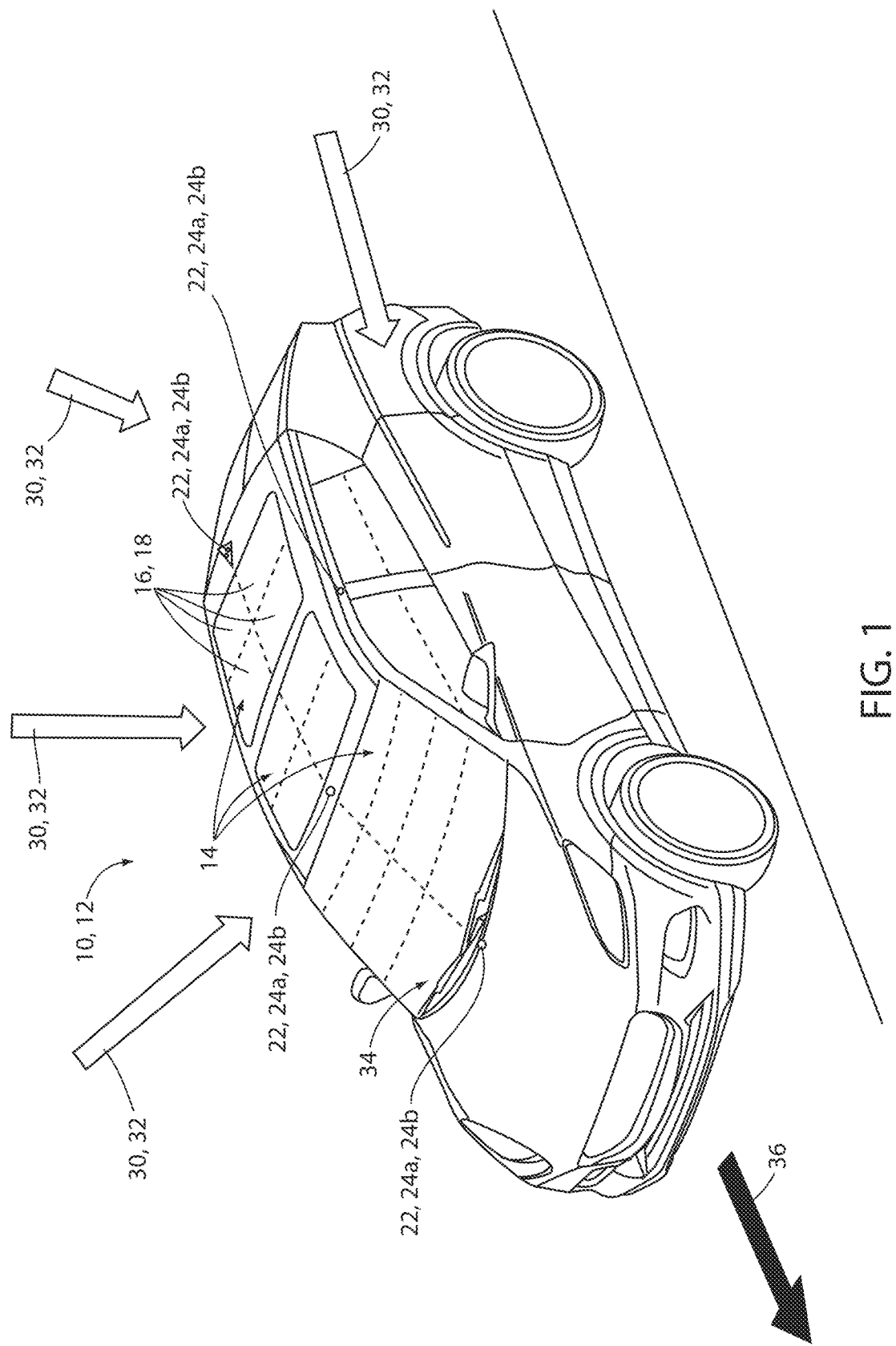
FIG. 1 is a projected view of a vehicle demonstrating a window control system configured to control a plurality of dimming windows.
Figure 2:
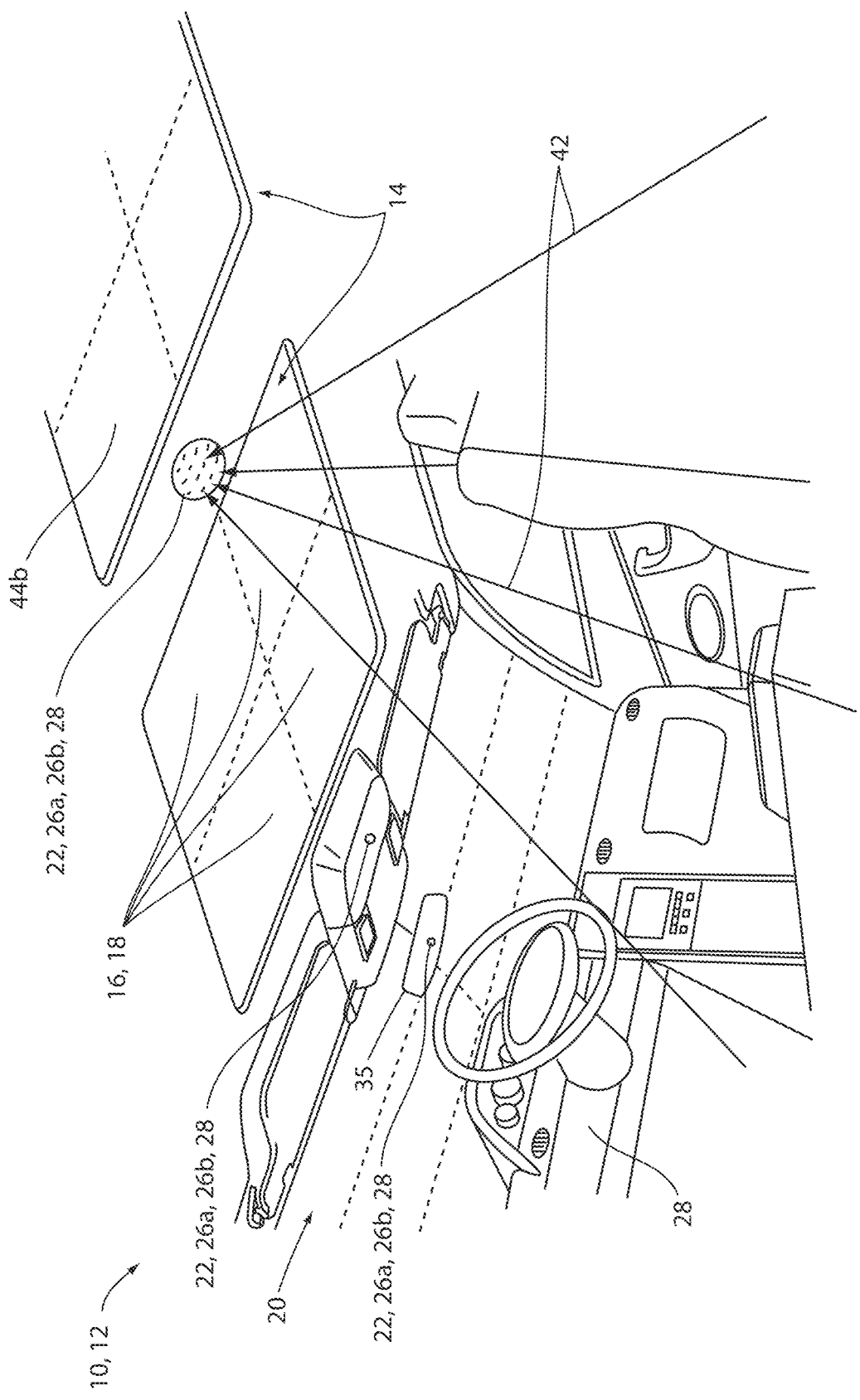
FIG. 2 is a projected view of a passenger compartment of a vehicle demonstrating a plurality of dimming windows.

Referring to FIGS. 1 and 2, in various embodiments, a window control system 12 for controlling light transmission through at least one window 14 may comprise at least one dimming window to be controlled, at least one sensor 22, and a controller 90 in communication with both the at least one sensor 22 and the at least one dimming window 14. The at least one sensor 22 may comprise at least one of an exterior light sensor 24, an interior light sensor 26, an outward facing sensor 27, and an occupancy sensor 28. The at least one dimming window 14 may be a vehicle window and may comprise at least one of a side window, a windshield, a rearview window, a vent window, and a sunroof.

Each of the at least one dimming windows 14 may be configured to control light transmission through the dimming window 14 or through a dimming zone 16 within the dimming window 14. In some embodiments, the at least one dimming window 14 may comprise a plurality of dimming zones 16, with each dimming zone comprising a portion of a dimming window 14. Each of the at least one dimming windows 14 or dimming zones 16 may control light transmission by selectively dimming or clearing the dimming window 14 or dimming zone 16 based on inputs received from at least one sensor 22. Inputs may comprise information on light levels exterior to the vehicle 10 and/or interior to the passenger compartment 20 of the vehicle 10. The at least one dimming window 14 may be configured to range in appearance from a fully clear or nearly fully clear state to a fully darkened state. In some embodiments, the at least one dimming window 14 may comprise a plurality of predetermined states, each state having a predetermined dimming level.

In some embodiments, each dimming zone 16 may operate independently of other dimming zones 16 in the same dimming window 14. Alternatively, in some embodiments, some or all of the dimming zones 16 may be in communication with other dimming zones 16 in the same or different vehicle windows 14 and may operate in conjunction with the other dimming zones 16.

The at least one sensor 22 may be configured to identify environmental lighting conditions proximate the vehicle 10, especially light that may enter the vehicle 10 through a vehicle window or a dimming window 14. Controller 90 (shown in FIG. 7) of the window control system 12 may be configured to automatically control a level of transmittance of light through at least one window 14 and/or through at least one dimming zone 16 within the at least one dimming window 14.

The at least one sensor 22 may comprise at least one exterior light sensor 24. In some embodiments, the at least one exterior light sensor 24 may comprise at least one ambient light sensor. The ambient light sensor may be configured to detect an ambient lighting condition of the environment exterior to and proximate the vehicle 10. In some embodiments, the at least one exterior light sensor 24 may comprise at least one directional light sensor or imager. The at least one directional light sensor may comprise a light sensor or an imager module configured to detect the light 30 impinging upon the vehicle 10. The at least one directional light sensor may be configured to identify both a light intensity level and an approximate direction of origin of the light 30 impinging on the vehicle 10. The at least one exterior light sensor 24 may be in communication with the controller 90 of the window control system 12 such that the controller 90 may be configured to identify an intensity and direction of the light 30 impinging on the vehicle 10 from different directions 32.

In some embodiments, the at least one exterior light sensor 24 may comprise at least one ambient light sensor and at least one directional light sensor or imager. Exterior light sensors 24 may be distributed in various locations on an exterior surface of the vehicle 10. Accordingly, each of the at least one exterior light sensors 24 may be configured to monitor various external regions of the vehicle 10 and to identify or map variations in the intensity of the light 30 impinging upon each of the regions of the vehicle 10.

In some embodiments, each of the light sensors or imagers discussed herein may be implemented as Semi-Conductor Charge-Coupled Devices (CCD) or pixel sensors of complementary Metal-Oxide-Semi-Conductor (CMOS) technologies.

In some embodiments, the window control system 12 may comprise and/or be in communication with a navigation system 34. The navigation system 34 may comprise a global positioning system (GPS) and/or a directional sensor (e.g., compass, magnetometer, etc.). Accordingly, based on a change in a position reported by the Global Positioning System (GPS) of the navigation system 34 and/or a change in a heading direction identified by the directional sensor of the navigation system 34, the controller 90 of the control system 12 may identify a heading direction 36 of the vehicle 10. Based on the heading direction 36, the time of day, and the geographic region in which the vehicle 10 is operating, the controller 90 may be configured to estimate a direction of the sun relative to the heading direction 36. Accordingly, the control system 12 may further be configured to utilize the estimated direction of the sun relative to the heading direction 36 of the vehicle 10 as one factor when controlling the transmittance of light through one or more of the dimming windows 14 and/or dimming zones 16 of the vehicle 10.

Referring now to FIG. 2, the passenger compartment 20 of vehicle 10 may comprise at least one interior light sensor 26. Similar to the at least one exterior light sensor 24, the at least one interior light sensor 26 may be implemented as an ambient light sensor, a directional light sensor, a combination ambient light sensor and direction light sensor, or a plurality of light sensors or imagers. In operation, the at least one interior light sensor 26 may be configured to identify various regions of the vehicle 10, the intensity of the light 30 impinging upon the regions, and, in some embodiments, the direction from which the light is traveling.

The at least one interior light sensor 26 may continuously or intermittently monitor light intensities in various regions of the passenger compartment 20 of the vehicle 10. The at least one interior light sensor 26 may communicate inputs on detected light levels to controller 90. Based on the relative intensity of light in each of the regions within the passenger compartment 20 of the vehicle 10, the controller 90 of the control system 12 may be configured to generate and monitor a light intensity map of the passenger compartment 20.

Figure 3:
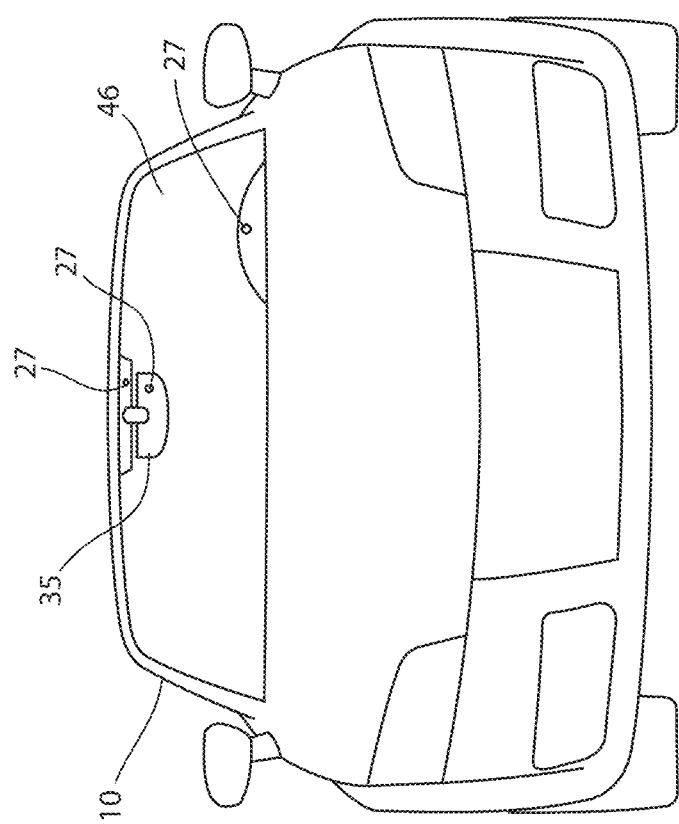
FIG. 3 is a front view of a vehicle demonstrating an outward facing light sensor as part of a window control system configured to control a plurality of dimming windows.

Referring to FIG. 3, at least one outward facing light sensor 27 may be configured to detect an ambient lighting condition in front of the vehicle 10 as seen through the windshield 46 of the vehicle 10. Similar to the at least one exterior light sensor 24 and the at least one interior light sensor 26, the at least one outward facing light sensor 27 may be implemented as an ambient light sensor, a directional light sensor, or a plurality of light sensors or imagers. Although the at least one outward facing light sensor 27 is shown disposed in a rearview mirror assembly 35, this example is for illustrative purposes only and is not meant to be limiting. The at least one outward facing light sensor 27 may additionally or alternatively be disposed on a vehicle dashboard, in a vehicle headliner, on an upper surface of the shield over the instrument panel, or any other suitable location and still be within the scope of this disclosure.

In some embodiments, the at least one outward facing light sensor 27 may be a component of an anti-glare system that prevents glare from appearing in images in rearview mirror assembly 35. In some embodiments, the at least one outward facing light sensor 27 may comprise a plurality of imagers or photodetectors configured to detect the amount of light entering the passenger compartment 20 of vehicle 10 through the windshield 46.

The at least one outward facing light sensor 27 may be in communication with the controller 90 of the window control system 12, and may allow the controller 90 to determine the amount of light coming through the windshield 46 of vehicle 10. This may allow controller 90 to selectively clear or darken at least one dimming window 14 or at least one dimming zone 16 in order to tailor the amount light transmission through windows to take into account light entering through the windshield 46 of vehicle 10. In some embodiments, the dimming window 14 or dimming zone 16 may comprise the windshield 46 of the vehicle 10 or any window or light transmissive portion of the vehicle 10.

The controller 90 of the control system 12 may be configured to dynamically control the transmittance of light through of each of the dimming windows 14 and/or dimming zones 16 within the dimming windows 14 thereby controlling the light entering the passenger compartment 20. In some embodiments, the controller 90 may control the transmittance of light through each of the dimming windows 14 or dimming zones 16 based on the light intensity map. In this way, the window control system 12 may monitor and adjust the intensity of light entering one or more regions within the passenger compartment 20 of vehicle 10.

The controller 90 of the window control system 12 may control the transmittance of the light 30 to ensure that each region of the passenger compartment 20 is illuminated to a desired lighting level by selectively dimming or clearing at least one of the dimming windows 14 or dimming zones 16. Controller 90 may also use the inputs to update the light intensity map and to determine whether adjustments need to be made to any of the dimming windows 14 or dimming zones 16 in response to detected light levels to keep the passenger compartment 20 of the vehicle 10 at a comfortable light level. If controller 90 determines that adjustments to any of the dimming windows 14 or dimming zones 16 are needed, the controller 90 may communicate with a window control module 50 (shown in FIG. 4) associated with the dimming window 14 or the dimming zone 16 to be adjusted. The window control module 50 may then selectively darken or clear an appropriate dimming window 14 or dimming zone 16, thereby causing the dimming window 14 or dimming zone 16 to adjust the level of light transmittance that can pass therethrough. The window control system 12 may thus limit the intensity of the light being transmitted through the windows 14 that may result in lighting imbalances and/or hotspots in the passenger compartment 20.

In some embodiments, the window control system 12 may be employed to eliminate disabling glare or interference glare, which may occur when light originating from the exterior of the vehicle hits a display or other readout of the vehicle rendering it unreadable. Disabling glare or interference glare impairs the view of objects without necessarily causing discomfort. Disabling glare is often caused by the inter-reflection of light within the eyeball, reducing the contrast between the task and the glare source to the point where the task cannot be distinguished. Thus, the disabling glare light may not result from an imbalance or hot spot relative to other light within the vehicle. Darkening of at least one of the dimming windows 14 or dimming zones 16 may, therefore, be employed to make the displays or readouts discernable in the presence of disabling glare. The at least one interior light sensor 26 may be located to detect and reduce the effects of the disabling glare so that the window control system 12 can respond accordingly, causing the selective adjustment of the transmissivity of at least one of the dimming windows 14 or the dimming zones 16.

In some embodiments, the window control system 12 may be used to eliminate discomfort glare. In contrast to disabling glare, discomfort glare causes an instinctive desire to look away from a bright light source or may cause difficulty in seeing a task. In situations where the light entering the vehicle 10 causes discomfort glare, at least one of the dimming windows 14 or dimming zones 16 may be dimmed to a transmittance level where the intensity of the light entering the vehicle 10 is reduced to a level where the vehicle occupant no longer experiences discomfort.

A number of factors may influence whether light entering the vehicle 10 will result in discomfort glare. For example, the illuminance of the glare source (intensity of the luminous flux emitted per unit area of the source), the adaptation level (luminous flux reaching eye and setting the adaptation of the eyes), the solid angle of the glare source (size of the glare source as seen by the observer), the position index (correction factor considering the different perceptions of glare sources for the horizontal and vertical displacements from the line of vision of the observer), and various physiological and psychological sources can all influence whether a given light level rises to a discomfort level. Since there is no universal model for conditions which may result in discomfort glare, the window control system 12 may comprise the ability to control the intensity of light entering the vehicle by the selective dimming of at least one of the diming windows 14 and the dimming zones 16. The at least one interior light sensor 26 may be employed to detect light at a given location within the passenger compartment 20 of the vehicle 10. The window control system 12 may employ a control algorithm that may adjust the amount of light that may be transmitted through at least one of the dimming windows 14 or dimming zones 16 such that the desired light intensity level is attained. Furthermore, the window control system 12 may adjust the dimming window 14 or dimming zone 16 dynamically to adapt to changing environmental conditions or vehicle orientations so that the desired light intensity level is maintained.

It is understood that different people experience discomfort glare differently from others based on the factors described above. Therefore, the control system 12 may further comprise one or more preset settings that correspond to different light intensity levels and may be associated with different users to allow the individual users to avoid discomfort glare.

In some cases, a threshold for the discomfort of vehicle occupants may be a function of the adaptation of the occupant's eyes. For example, in brighter ambient conditions, the iris of the eye may contract, therefore limiting the light that enters the eye. The eye will, therefore, be less sensitive to glare, and the light levels that are perceived as comfortable may all shift to higher levels. Conversely, in dimmer ambient conditions, the iris of the eye may dilate, leading to more sensitivity to glare. The light levels perceived as comfortable under these conditions may shift to lower values. Thus, in some circumstances, a user may experience discomfort due to high levels of light entering through a sunroof or other glazing locations due to the relative ambient light entering the windshield which determines the adaptation level for the occupant's eyes. In response to this, in some embodiments, the window control system 12 may include an adjustment based on light levels that may be perceived by a vehicle occupant looking through the vehicle windshield 46.

Outward facing sensor 27 may be configured to detect light levels entering the vehicle 10 through the windshield 46, and may communicate those light levels to controller 90. In some embodiments, controller 90 may selectively dim the windshield 46 or one or more dimming zones 16 within the windshield 46 based on detected light levels passing through the windshield 46. In some embodiments, controller 90 may compare the intensity of the light entering through the windshield 46 with an ambient light level. Controller 90 may selectively dim the windshield 46 or one or more dimming zones 16 within the windshield 46 based on the absolute intensity of the light entering through the windshield, the difference in intensities of the light entering through the windshield 46 and the ambient light, or a combination of the two. Alternatively, in some embodiments, controller 90 may be configured to compare light levels entering through the windshield 46 with the light intensity map to determine whether the light entering through the windshield 46 may cause glare issues for an occupant, especially one in the driver's seat, of the vehicle 10.

In some embodiments, window control system 12 may be in communication with an in-cabin sensor (not shown) configured to monitor a driver. The in-cabin sensor may be configured to determine whether a driver is wearing sunglasses or other eyewear that may reduce the intensity of incoming light entering through the windshield 46 of vehicle 10. The window control system 12 may be configured to adjust window dimming levels based on factors such as, for example, whether the vehicle occupant is wearing sunglasses.

In some embodiments, the in-cabin sensor may be configured to monitor the size of a driver's pupil or to monitor changes in the size of the driver's pupil. The window control system 12 may take the relative size of the driver's pupil into consideration when determining whether to dim or clear the windshield 46, a dimming zone 16 within the windshield 46, or an alternate glazing location such as a sunroof or side lite. For example, if the in-cabin sensor detects that the driver's pupil is relatively dilated, the window control system 12 may lower the threshold at which the windshield 46, a dimming zone 16 within the windshield 46, or an alternate glazing location such as a sunroof or side lite may darken.

It is further understood that the window control system 12 may simultaneously adjust one or more of the dimming zones 16 for one or more dimming windows 14 such that multiple different glare conditions are mitigated. In addition to the preset settings that may correspond to intermediate darkening states, the window control system 12 may also be configured to allow the manual or automatic adjustment of at least one of the dimming windows 14 and the dimming zones 16. The allowable adjustment may range from a fully clear or nearly fully clear state to a fully darkened state.

In various embodiments, the window control system 12 may be operable to control the transmission of light passing through the dimming windows 14 into a plurality of regions in the passenger compartment 20 of the vehicle 10. The regions of the vehicle 10 may comprise, for example, a front passenger compartment, a rear passenger compartment, a driver side of a passenger compartment, a passenger's side of the passenger compartment, as well as additional rows or portions of the passenger compartment that may receive light through one or more dimming windows 14.

The number of dimming windows 14 and dimming zones 16 which may be controlled by the window control system 12 may vary based on the number and location of the regions of the vehicle and the intensity and the direction of incoming light. For example, in some embodiments, a first sunroof panel 44a and a second sunroof panel 44b may each comprise a plurality of dimming zones 16. Each of the dimming zones 16 may comprise an electro-optic apparatus 18 that may be independently controlled by the controller 90 of the window control system 12 to adjust a transmittance of light passing therethrough. The number of dimming zones 16 may vary based on the desired operation of the window control system 12 such that the window control system 12 may be implemented and scaled for a variety of applications.

In some embodiments, the at least one occupancy sensor 28 of the window control system 12 may comprise an imager. In some embodiments, the occupancy sensor 28 may be implemented in the vehicle 10 as a single sensor combined with the interior light sensor 26. For example, in some embodiments, the at least one interior light sensor 26 and the at least one occupancy sensor 28 may correspond to one or more imagers having fields of view configured to capture various regions within the passenger compartment 20. In this way, a controller 90 of the window control system 12 may be operable to capture image data including images of occupants of the vehicle 10, as well as variations in the light intensity in the passenger compartment 20 of vehicle 10. In this configuration, the controller 90 of the control system 12 may accurately identify the occupancy and light intensity within each of the regions within the passenger compartment 20. The at least one occupancy sensor 28 may also be implemented in the vehicle 10 as one or more weight sensors or various other sensors that may be utilized to identify the positions of occupants within the passenger compartment 20.

In some embodiments, the window control system 12 may utilize a combination of the light intensity map generated based on inputs from the at least one interior light sensor 26 and one of inputs indicating the direction 32 and intensity of the light 30 identified by the at least one exterior light sensor 24 and inputs received from the outward facing sensor 27 indicating the intensity of light entering through the windshield 46. Additionally or alternatively, the control system 12 may utilize information captured by the at least one occupancy sensor 28 in combination with at least one of the light intensity map, data from the at least one interior light sensor 26, data from the at least one outward facing sensor 27, and data captured by the at least one exterior light sensor 24 to determine the intensity and/or direction 32 of the light 30 impinging on the vehicle 10. The window control system 12 may then adjust the dimming windows 14 and/or dimming zones 16 to ensure that the intensity of the light 30 transmitted through the dimming windows 14 and/or the dimming zones 16 into the vehicle 10 is consistent, thereby limiting variations in the light intensity inside the vehicle.

In some embodiments, the controller 90 of the control system 12 may be configured to identify both the direction 32 of the light 30 impinging on the vehicle 10 and which regions of the passenger compartment 20 have occupants positioned within them. Based on the location of vehicle occupants and the direction of the incoming light 30, the window control system 12 may control the intensity of the light passing through the dimming windows 14 and/or dimming zones 16, thereby limiting the intensity of the light 30 in the directions 32 that align with one or more of the vehicle occupants.

Figure 4:
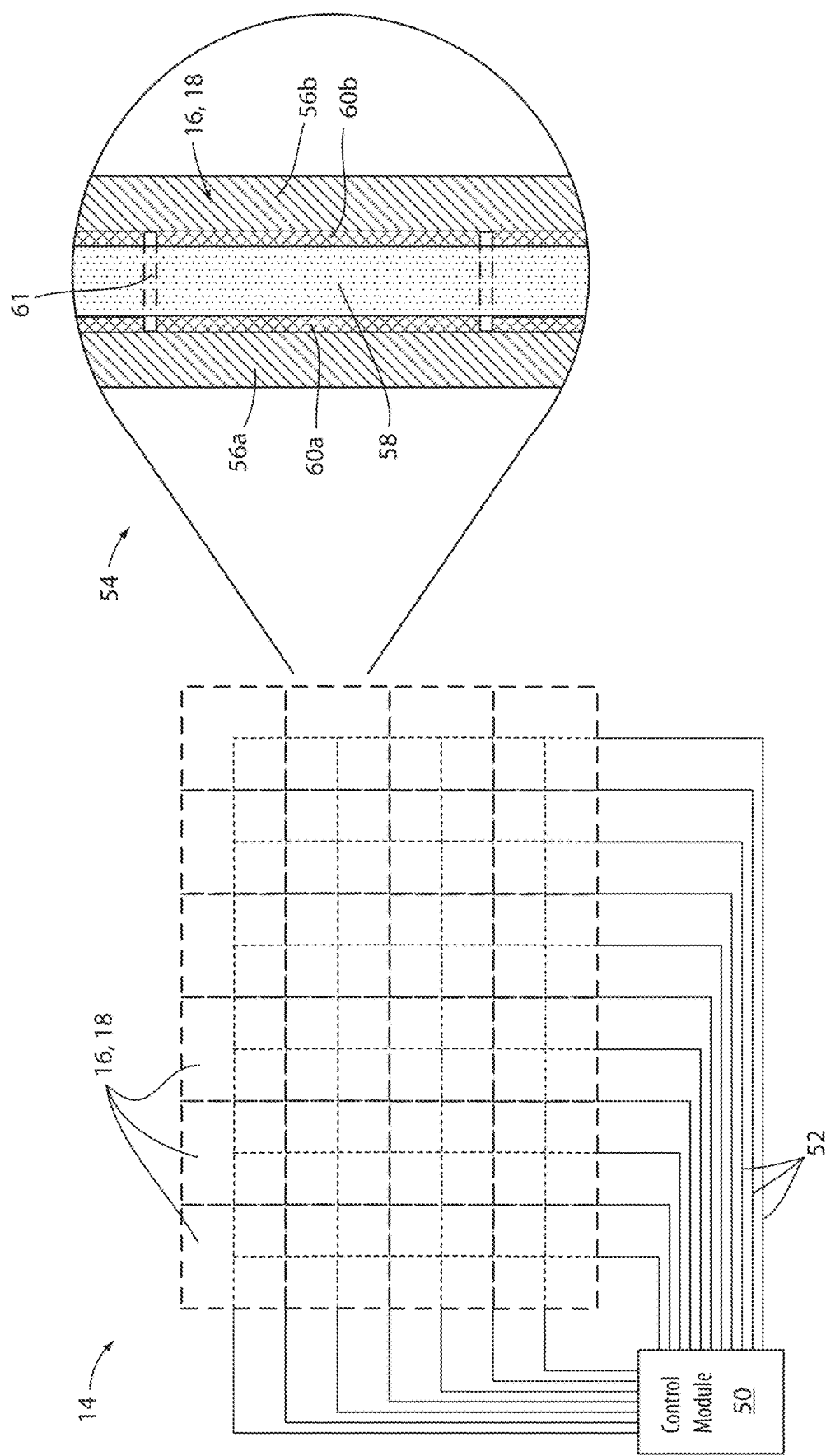
FIG. 4 is a schematic diagram of a dimming window including a detailed cross-sectional view of an electro-optic apparatus.

Referring now to FIG. 4, a schematic diagram of the dimming window 14 illustrates a plurality of dimming zones 16. Each of the dimming zones 16 is communicatively connected to a window control module 50. In this configuration, the window control module 50 may be operable to control a voltage or other electrical attribute supplied to each of the dimming zones 16 through a plurality of conductive leads 52. By controlling signals or voltages supplied to the conductive leads 52, the control module 50 may control a variable transmittance through the electro-optic material of each of the electro-optic apparatuses 18 forming the dimming zones 16. The conductive leads 52 may be in electrical communication with each of the dimming zones 16 via a plurality of transparent, opaque, or transflective conducting layers which may form a matrix of conductive paths configured to independently communicate electrical signals from the window control module 50 to each of the dimming zones 16.

Figure 5:
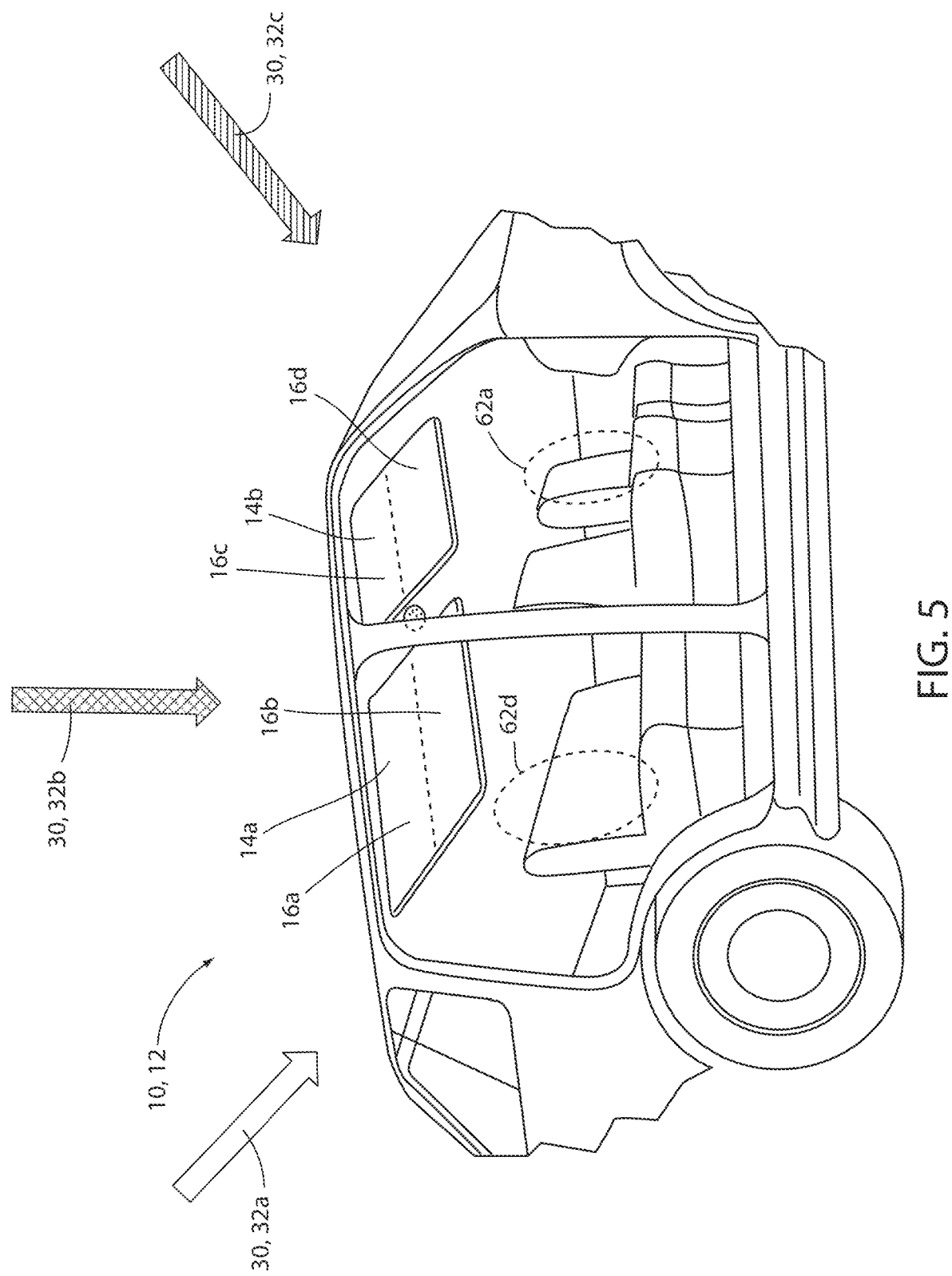
FIG. 5 is a projected view of a vehicle passenger compartment demonstrating an exemplary operation of a window control system.

Referring now to FIG. 5, a projected view of the passenger compartment 20 of the vehicle 10, as previously introduced in FIGS. 1 and 2, is shown demonstrating an exemplary operation of the window control system 12. As previously discussed, the window control system 12 may be operable to utilize data collected by at least one exterior light sensor 24, the at least one interior light sensor 26, and/or the at least one occupancy sensor 28 to control the operation of the dimming windows 14 and/or dimming zones 16. In a first example, the controller 90 of the window control system 12 may utilize data from the at least one occupancy sensor 28 to identify a first occupant 62a located in a front region on a driver side of the passenger compartment 20. Additionally, the window control system 12 may identify the direction 32 of the light 30 impinging on the exterior of the vehicle 10 based on inputs received from the at least one exterior light sensor 24. Similarly, the controller 90 of the window control system 12 may identify the regions within the passenger compartment 20 where the light 30 is transmitted through the dimming windows 14 and/or dimming zones 16 with high intensity based on the light intensity map. In this way, the window control system 12 may selectively control the transmittance of each of the dimming windows 14 and/or dimming zones 16 to limit intense glare light from reaching the first occupant 62a.

In the example of the first occupant 62a located in the front region on the driver side of the passenger compartment 20, the window control system 12 may respond differently based on the light 30 impinging on the vehicle 10 in each of the first direction 32a, a second direction 32b, and a third direction 32c. In response to the light 30 impinging on the vehicle 10 in the first direction 32a, the controller 90 of the window control system 12 may control each of a first diming zone 16a and a second dimming zone 16b of a first dimming window 14a to limit the transmittance of the light 30 in the first direction 32a from reaching the first occupant 62a. In response to detecting the light impinging on the vehicle 10 in the second direction 32b, the controller 90 of the window control system 12 may limit the transmittance of the light 30 through each of the first dimming zone 16a, the second dimming zone 16b, as well as a third dimming zone 16c and a fourth dimming zone 16d of a second dimming window 14b. Finally, in response to the light 30 impinging on the vehicle 10 in the third direction 32c, the controller 90 of the window control system 12 may control each of the dimming zones 16a-16d to fully transmit light if the third direction 32c is not directed through the first dimming window 14a or the second dimming window 14b in the direction of the first occupant 62a. Accordingly, the window control system 12 may independently control each of the dimming windows 14 and/or dimming zones 16 based on the direction 32 of the light 30 impinging on the vehicle 10 and a location of an occupant within the passenger compartment 20.

In another example, a second passenger or occupant 62b may be identified by the window control system 12 as being located in a rear region on a passenger side of the passenger compartment 20. In response to the detection of the second occupant 62b, the window control system 12 may respond differently than in the case of the first occupant 62a as previously discussed. For example, in response to the light 30 impinging on the vehicle 10 in the first direction, the window control system 12 may not limit or maintain a high level of transparency in each of the dimming zones 16a-16d because the second occupant 62b may not be located along a path of the light 30 transmitted into the vehicle 10 from the first direction 32a. In response to the light 30 impinging on the vehicle 10 in the second direction 32b, the window control system 12 may control each of the dimming zones 16a-16d to limit the transmittance of light 30 into the passenger compartment 20. Finally, in response to the detection of the light 30 impinging on the vehicle 10 in the third direction 32c, the window control system 12 may control the third dimming zone 16c and the fourth dimming zone 16d to limit the passage of the light 30 while maintaining a high level of transparency or transmittance through the first dimming zone 16a and the second dimming zone 16b. Accordingly, based on the examples discussed herein, the window control system 12 may automatically control the transmittance of each of the dimming windows 14 and/or dimming zones 16 to ensure that passengers or occupants located in any region of the vehicle 10 may be transported in comfort.

Figure 6:
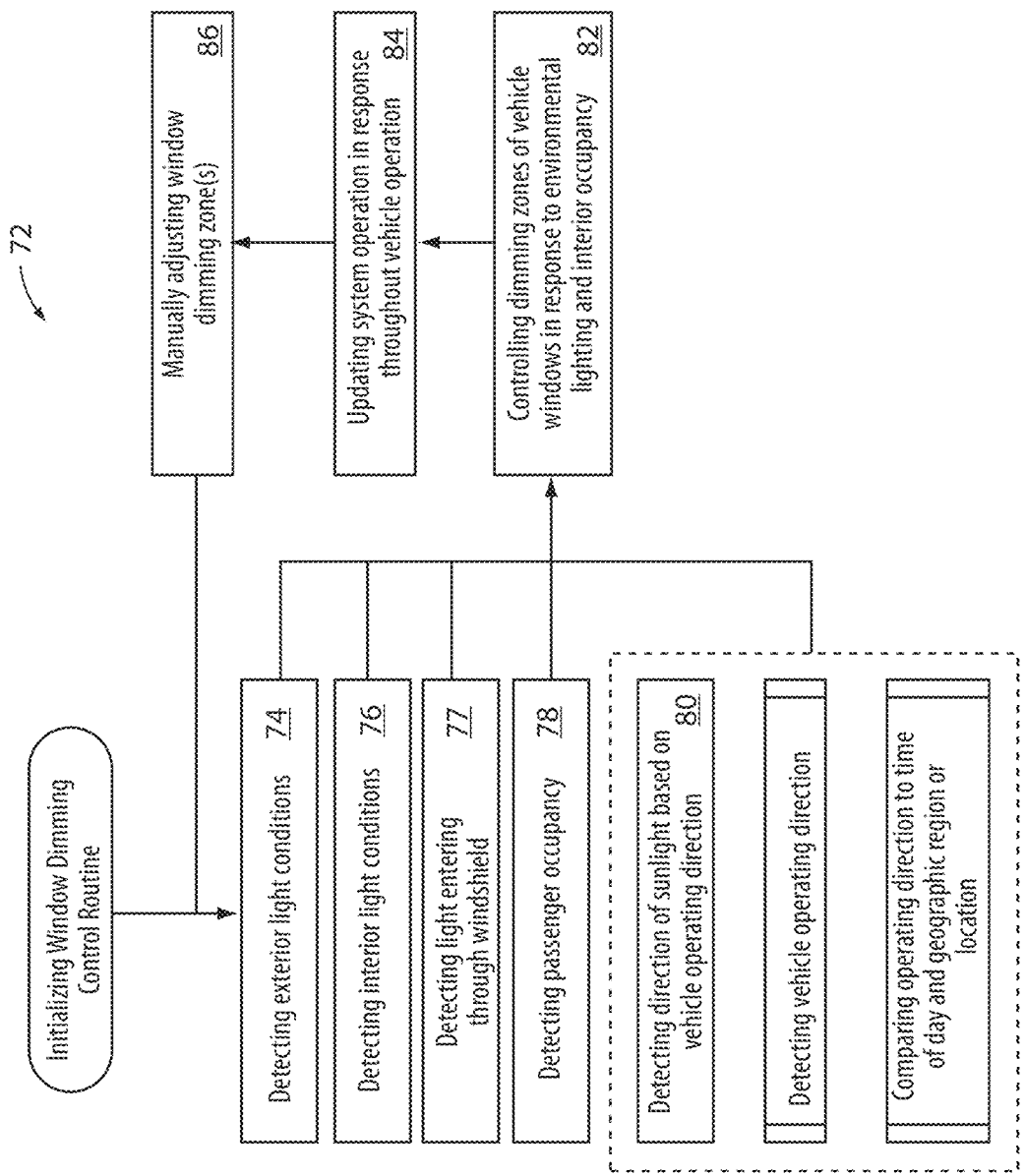
FIG. 6 is a control diagram of a window control system configured to control a plurality of dimming zones or dimming windows of a vehicle.

Referring now to FIG. 6, a control diagram of a control routine 72 for the window control system 12 is shown. In operation, the controller 90 of the window control system 12 may be in communication with at least one of the at least one exterior light sensor 24, the at least one interior light sensor 26, the at least one outward facing light sensor 27, and/or the at least one occupancy sensor 28. Based on the data captured by one or more of the at least one sensors 22, the window control system 12 may be configured to control the dimming windows 14 and/or dimming zones 16. Additionally, as previously discussed, the controller 90 of the window control system 12 may utilize a vehicle operating direction and/or geographic data to infer or estimate the direction 32 of the light 30 impinging on the vehicle 10. Accordingly, the control routine 72 may provide for detecting the exterior light conditions (74), detecting interior light conditions (76), detecting light transmission into vehicle 10 through windshield 46 (77), and/or detecting a passenger occupancy (78). The control routine 72 may further detect or infer a direction of the light 30 based on the vehicle operating direction (80).

In some embodiments, the control routine may provide for only one or a subset of steps (74)-(78) and still be within the scope of this disclosure. In some embodiments, the control routine may be capable of generating a light intensity map based on received inputs from at least one of the at least one sensor 22, the at least one outward facing sensor 27, and the at least one occupancy sensor 28. In some embodiments, the control routine may be capable of receiving inputs from at least one of the at least one sensor 22, the at least one outward facing sensor 27, and the at least one occupancy sensor 28 and using that information to cause the controller 90 to activate the at least one dimming window 14 or the at least one dimming zone 16. Upon activation, the at least one dimming window 14 or the at least one dimming zone may at least partially darken or partially clear.

Based on the data gathered by one or more of the sensors 22-28 in each of steps (74)-(78), the controller 90 of the window control system 12 may control each of the dimming windows 14 and/or dimming zones 16 of the vehicle 10 in response to environmental lighting and/or interior occupancy of the vehicle 10 (82). During operation of the vehicle 10, the controller 90 may update the operation of the window control system 12 throughout the operation of the vehicle 10 (84). Accordingly, the controller 90 of the window control system 12 may update and adjust the transmittance through each of the dimming windows 14 and/or dimming zones 16 based on changes in the direction 32 of the light 30 and changes in the intensity of the light 30 entering the vehicle 10. Additionally or alternatively, the transmittance of at least one of the dimming windows 14 and/or dimming zones 16 may be configured to be manually adjusted. In some embodiments, a user interface may allow an occupant of the vehicle 10 to manually adjust the transmittance. Accordingly, the window control system 12 may provide for flexible operation that may be implemented to suit a variety of applications.

Figure 7:
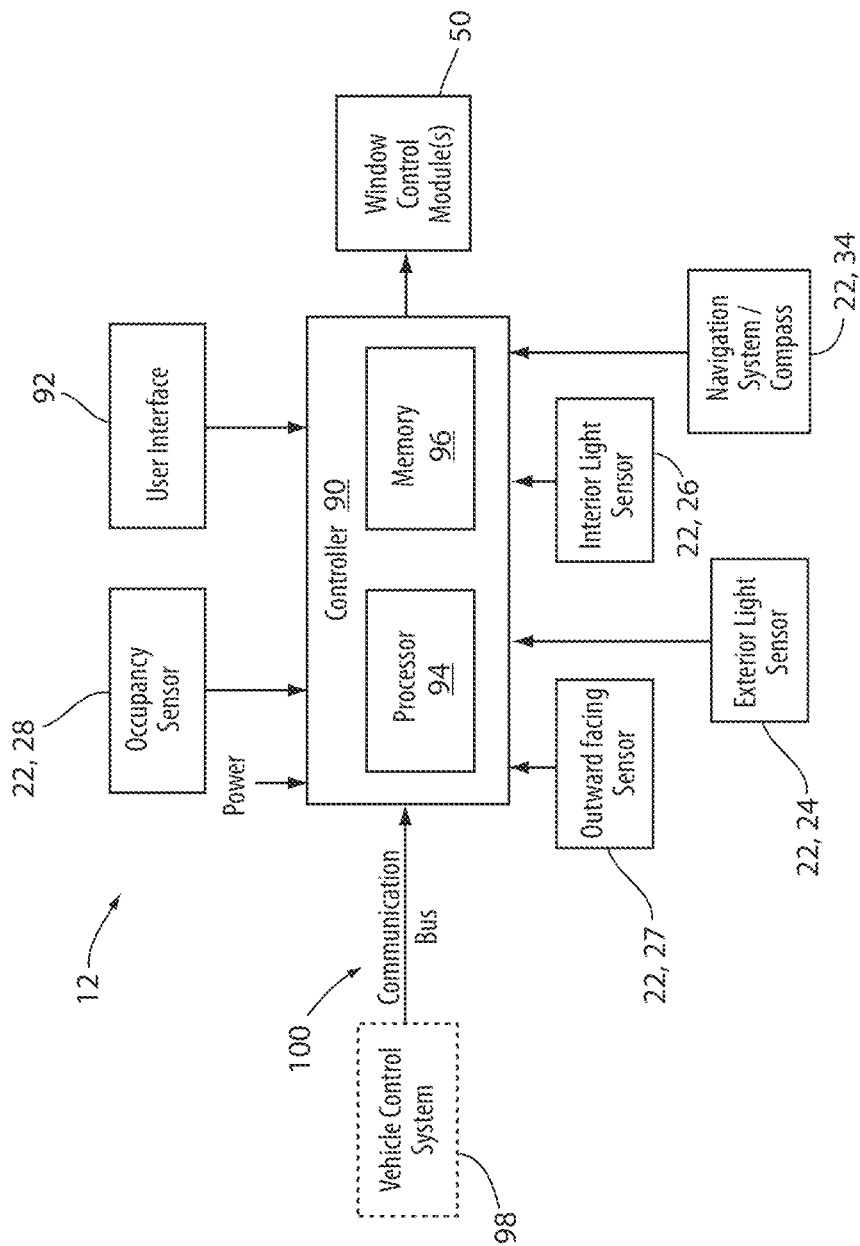
FIG. 7 is a block diagram of a window control system in accordance with the disclosure.

Referring to FIG. 7, the controller 90 of the window control system 12 may be in communication with one or more of the at least one sensors 22. The at least one sensor 22 may comprise at least one of an exterior light sensor 24, an interior light sensor 26, an outward facing sensor 27, and an occupancy sensor 28. As previously discussed, the exterior light sensor may correspond to one or more of an ambient light sensor, a directional light sensor, and/or a plurality of light sensors and/or imagers. The exterior light sensor 24 may be disposed on an exterior surface of the vehicle 10. The at least one interior light sensor 26 may correspond to an ambient light sensor, a directional light sensor or directional imager, and/or a plurality of light sensors or imagers. The interior light sensor may be disposed within the passenger compartment 20 of the vehicle 10. The outward facing light sensor 27 may correspond to one or more of a directional light sensor, an ambient light sensor, and/or a plurality of light sensors or imagers. The outward facing light sensor 27 may be disposed within the passenger compartment 20 of vehicle 10. The outward facing light sensor 27 may be configured to face outward toward the exterior of the vehicle 10, and the outward facing light sensor 27 may be configured to face outward through the windshield 46 of vehicle 10, thereby allowing outward facing light sensor 27 to monitor light levels of light entering the passenger compartment 20 of vehicle 10 through the windshield 46. The at least one occupancy sensor 28 may correspond to an imager, similar and/or commonly implemented with the at least one interior light sensor 26, a weight sensor, and/or a variety of additional sensors that may be utilized to detect an occupancy within the passenger compartment 20 of the vehicle 10.

In some embodiments, the controller 90 may additionally be in communication with a user interface 92 which may be disposed in the passenger compartment 20 of the vehicle 10. The user interface 92 may provide for manual control of the dimming windows 14 and/or dimming zones 16 as discussed herein.

The controller 90 may further include a processor 94, which may comprise one or more circuits configured to process data received from the sensors 24-28. The processor 94 may be in communication with a memory 96, which may be configured to store various instructions and routines configured to control the window control module 50 or modules in communication with the controller 90. In various embodiments, the controller 90 may be in communication with a vehicle control module 98 via a communication bus 100. The communication bus 100 may be configured to deliver signals to the controller 90 identifying various states of the vehicle 10. For example, the communication bus 100 may be configured to communicate an operating condition of the vehicle (e.g., an ignition activation, drive gear selection, occupancy detection, headlight operation, etc.) or any other information or control signals that may be communicated by the communication bus 100. Accordingly, the window control system 12 may provide for a flexible solution to control dimming windows 14 and/or dimming zones 16 to improve the lighting and comfort for occupants of the vehicle 10.

In some embodiments, the dimming window 14 or dimming zone 16 may comprise an electro-optic device. The electro-optic device may comprise a first substrate 56a oriented to a second substrate 56b in a spaced apart configuration. An electro-optic medium 58 (e.g., electrochromic material) may be enclosed between the first substrate 56a and the second substrate 56b. The electro-optic material may comprise a plurality of electrochromic layers disposed on surfaces of electrodes 60a and 60b. In such an embodiment, the electrochromic layers may not be continuous across the electro-optic apparatuses 18 and may be separated by an electrolyte layer.

The first transparent electrode 60a may be disposed between the first transparent substrate 56a and the electro-optic medium 58, and the second transparent electrode 60b may be disposed between the second substrate 56b and the electrochromic medium 58.

In some embodiments, each of the dimming zones 16 may be partitioned and/or separated by a substantially transparent divider 61. In this configuration, each of the dimming zones may be conductively separated and distinct such that the window control module 50 of the window control system 12 may independently control the transmittance of light through each of the dimming zones 16. Accordingly, each of the dimming windows 14 may provide for each of the dimming zones 16 to vary in transmittance independently in response to a voltage potential or other electrical property or signal applied to the conductive leads 52.

In an exemplary embodiment, an electro-optic medium 58 may be used as a laminate to hold the first substrate 56a and the second substrate 56b together. The electro-optic apparatus 18 and substrates 56a, 56b may be formed of various materials. For example, the substrates 56a and 56b may be of plastic. Plastics for the substrates may include but are not limited to the following: a clear polycarbonate, polyethylene terephthalate (PET), polyamide, acrylic, cyclic olefin, polyethylene (PEN), metallocene polyethylene (mPE), silicone, urethane, and/or various polymeric materials. The substrates 56 may also be of various forms of glass, including, but not limited to, soda lime float glass, borosilicate glass, boroaluminosilicate glass, or various other compositions. When using glass substrates, they can be annealed, heat strengthened, chemically strengthened, partially tempered or fully tempered. The electro-optic apparatus 18 can be held by a partial or full frame that may be used to support and move the window 14 as desired.

The substrates 56, as well as one or more protective coatings, may be adhered together by one or more cross-linked materials. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as heavily cross-linked materials to adhere to one or more of the substrates 56a, 56b and/or additional protective layers. Accordingly, the specific examples described herein are to be considered non-limiting examples.

In some embodiments, the electro-optic apparatus 18 may be configured to conform to one or more standards. An example of such a standard may include a ball drop test of the Federal Motor Vehicle Safety Standards (FMVSS). In this test, the window 14 may be required to withstand the impact of an approximately 225 gram (8 ounce) steel ball dropped from 9 meters under normal gravitational force on earth (i.e., approximately 9.8 m/s2). Accordingly, the electro-optic apparatus may be configured to conform to SAE Z26.1 tests 9 and 12 for FMVSS test for impact strength and similar test. Further discussion and examples of structures that may be utilized for the electro-optic apparatus 18 are discussed in U.S. Pat. No. 10,668,789 entitled "SUNROOF INCORPORATING ELECTRO-OPTIC ELEMENT," the disclosure of which is incorporated herein by reference in its entirety.

In some embodiments, the electro-optic apparatus 18 may comprise memory chemistry configured to retain a state of transmittance when the vehicle 10 and the window control system 12 are inactive (e.g. not actively supplied energy from a power supply of the vehicle 10). That is, the electro-optic apparatus 18 may be implemented as an electrochromic device having a persistent color memory configured to provide a current during clearing for a substantial time period after being charged. An example of such a device is discussed in U.S. Pat. No. 9,964,828 entitled "ELECTROCHEMICAL ENERGY STORAGE DEVICES," the disclosure of which is incorporated herein by reference in its entirety.

The electro-optic apparatus 18 as discussed herein may be configured to vary a transmission of light at least through the substrates 56a and 56b in the various embodiments of the windows, windscreens, and/or sunroofs discussed herein. The electro-optic apparatus 18 may correspond to an electrochromic device being configured to vary the transmissivity of the sunroof assemblies discussed herein in response to an applied voltage from one or more of the control modules 50. Examples of control circuits and related devices that may be configured to provide for electrodes and hardware configured to control the electro-optic apparatus 18 are generally described in commonly assigned U.S. Pat. No. 8,547,624 entitled VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS,"

each of which is incorporated herein by reference in its entirety. In other embodiments, the electro-optic device may comprise a suspended particle device, liquid crystal, or other systems that changes transmittance with the application of an electrical signal or property.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

What is claimed is:

1. A window control system configured to control light transmittance through a plurality of dimming zones of at least one window, the window control system comprising:
    a plurality of electro-optic devices, each of the electro-optic devices configured to selectively adjust the transmittance of light through one of the dimming zones of the at least one window;
    at least one sensor configured to identify a direction of light impinging upon at least one of the dimming zones of the at least one window of the vehicle;
    at least one occupancy sensor configured to identify a location of at least one occupant in a passenger compartment of the vehicle; and
    a controller in communication with the at least one electro-optic device and the at least one sensor and the at least one occupancy sensor, wherein the controller is configured to:
        determine a path of a light transmitted through a passenger compartment of a vehicle in response to the direction of the light; and
        control the transmittance of the light through the at least one of the dimming zones in response to a determination of whether the path of the light transmitted through the passenger compartment impinges upon the location of the at least one occupant.

2. The window control system according to claim 1, wherein the at least one window is one of a side window, a windshield, a rear window, a vent window, and a sunroof.

3. The window control system according to claim 2, wherein the at least one sensor comprises an exterior light sensor configured to identify a direction of light impinging on the vehicle.

4. The window control system according to claim 2, wherein the at least one sensor comprises an interior light sensor configured to identify a light intensity within the passenger compartment of the vehicle.

5. The window control system according to claim 2, wherein the at least one sensor comprises an outward facing sensor configured to identify a light intensity passing through a windshield to a passenger compartment of the vehicle.

6. The window control system according to claim 1, wherein the controller comprises a processor; and wherein the processor is configured to generate a light intensity map based on inputs received from the at least one sensor.

7. The window control system according to claim 6, wherein the controller controls the transmittance of light based on the light intensity map.

8. The window control system according to claim 1, further comprising a second dimming zone of the plurality of dimming zones within the window; wherein the control of the transmittance of light through the second dimming zone is independent of the control of the transmittance of light through the first dimming zone.

9. The window control system according to claim 1, further comprising at least a second window; wherein the control of the light transmittance through the second window is independent of the control of the transmittance of light through the at least one window.

10. The window control system according to claim 1, wherein the controller is further configured to:
    identify a path of the light entering through the at least one window based on the direction of the light, and control a first transmittance of the light through a first dimming zone and a second transmittance of light through a second dimming zone, wherein the second transmittance is greater than the first transmittance.

11. The window control system according to claim 1, wherein the controller is further configured to:
    control a first transmittance of the light through a first dimming zone and a second transmittance of light through a second zone based on the location of an occupant and the direction of the light.

12. The window control system according to claim 1, wherein the at least one dimming zone comprises an entire window.

13. A method for controlling light transmission through at least a portion of a window, comprising the steps of:
    initializing a window control routine for controlling light transmission through at least a portion of the window;
    receiving, by a controller, a plurality of inputs from at least one of an interior sensor, an exterior sensor, an outward facing sensor, and an occupancy sensor;
    in response to the plurality of inputs, identifying a direction of light impinging upon at least one dimming zone of a plurality of dimming zones of at least one window;
    determining a path of a light transmitted into a passenger compartment of a vehicle in response to the direction of the light; and controlling at least one dimming zone of a vehicle window in response to a determination of whether the path of the light transmitted through the passenger compartment impinges upon the location of the at least one occupant.

14. The method according to claim 13, further comprising updating the system operation in response to changes in the received inputs.

15. The method according to claim 13, further comprising manually adjusting, by a user through a user interface, at least one dimming zone.

16. The method according to claim 13, further comprising detecting a direction in which the vehicle is heading.

17. The method according to claim 16, further comprising detecting the direction of sunlight hitting the vehicle based on a vehicle operating direction.

18. The method according to claim 13, further comprising comparing a vehicle operating direction to information on a time of day and geographic region to determine the direction from which sunlight is striking the vehicle.

19. The window control system according to claim 1, wherein the controller is further configured to maintain a transparency of the at least one dimming zone in response to the location of the occupant not being located along the path of the light transmitted through the passenger compartment.

* * * * *